US012571524B2

(12) United States Patent
Sheehy et al.

(10) Patent No.: US 12,571,524 B2
(45) Date of Patent: Mar. 10, 2026

(54) PENDANT LIGHT STRUCTURE

(71) Applicant: ABL IP Holding, LLC, Atlanta, GA (US)

(72) Inventors: James Sheehy, Atlanta, GA (US); Srinivas Gade, Atlanta, GA (US)

(73) Assignee: ABL IP Holding, LLC, Atlanta, GA (US)

( * ) Notice: Subject to any disclaimer, the term of this patent is extended or adjusted under 35 U.S.C. 154(b) by 0 days.

(21) Appl. No.: 19/050,540

(22) Filed: Feb. 11, 2025

(65) Prior Publication Data

US 2025/0369600 A1 Dec. 4, 2025

Related U.S. Application Data

(60) Provisional application No. 63/655,538, filed on Jun. 3, 2024.

(51) Int. Cl.
*F21V 21/104* (2006.01)
*F21S 8/06* (2006.01)

(52) U.S. Cl.
CPC .............. *F21V 21/104* (2013.01); *F21S 8/06* (2013.01); *F21S 8/061* (2013.01); *F21S 8/063* (2013.01)

(58) Field of Classification Search
CPC ......... F21V 21/104; F21S 8/061; F21S 8/063; F21S 8/06; F21S 8/065; F21S 8/066; F21S 8/068
USPC .......................................................... 362/404
See application file for complete search history.

(56) References Cited

U.S. PATENT DOCUMENTS 7,033,048 B2 * 4/2006 Sin .......................... F21V 21/36 362/802
11,506,377 B1 * 11/2022 Wang ...................... F21V 21/03
2022/0252252 A1 * 8/2022 Wang .................... F04D 25/088

* cited by examiner

*Primary Examiner* — Laura K Tso
(74) *Attorney, Agent, or Firm* — Grossman, Tucker, Perreault Pfleger, PLLC

(57) ABSTRACT

The present disclosure provides a pendant light that includes at least one side wall portion; and a top portion coupled to the at least one side wall portion; the top portion including at least one arcuate slot and at least one set screw engagably disposed within the at least one arcuate slot; wherein the at least one set screw configured to disengage from the at least one arcuate slot to provide rotation of the at least one side wall portion and top portion; and wherein the at least one set screw configured to engage to the at least one arcuate slot to prevent rotation of the at least one side wall portion and top portion.

19 Claims, 6 Drawing Sheets

PENDANT LIGHT STRUCTURE

CROSS-REFERENCE TO RELATED APPLICATIONS

The present application claims the benefit of U.S. Provisional Application Ser. No. 63/655,538, filed Jun. 3, 2024, which is hereby incorporated by reference in its entirety.

TECHNICAL FIELD

The present disclosure is generally directed to a pendant light, and, more particularly to an adjustable pendant light.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Although the following Detailed Description will proceed with reference being made to illustrative embodiments, many alternatives, modifications and variations thereof will be apparent to those skilled in the art.

DETAILED DESCRIPTION

The present disclosure provides an adjustable pendant light structure configured to be adjustable to align a face or sidewall of the pendant light structure to other pendant light structures and/or to a wall or building structure. For example, if a row of similar, non-circular pendant lights are not aligned to one another and/or to a wall, such an arrangement can appear as haphazard and unprofessional. Accordingly, the teaching of the present disclosure provides an adjustable pendant light structure that solves aesthetic problems associated with mis-alignment. The adjustable pendant light structures disclosed herein may be used for indoor and/or outdoor lighting applications.

Figure 1:
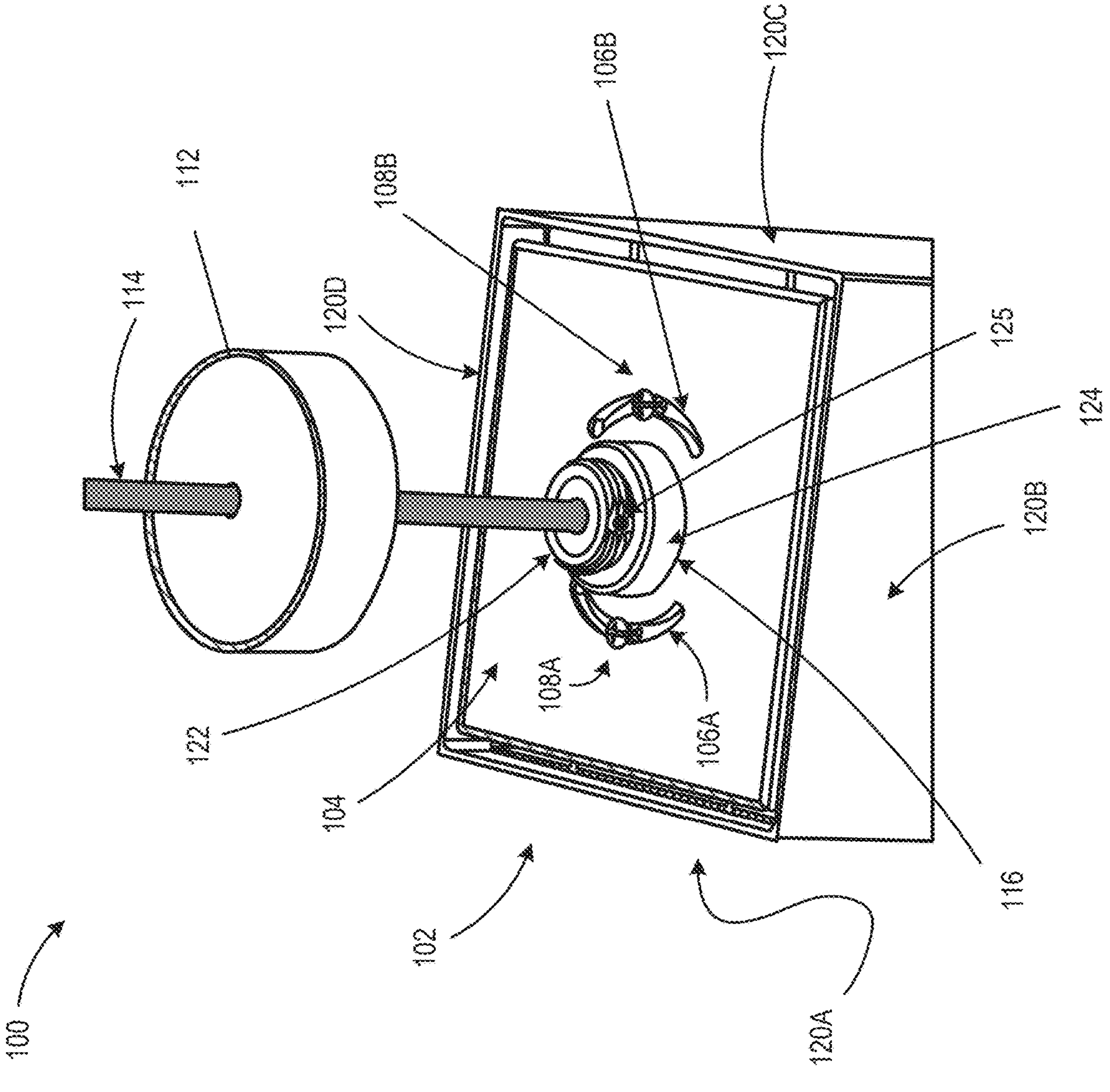
FIG. 1 illustrates an isometric view of a pendant light structure according to embodiments of the present disclosure.

FIG. 1 illustrates an isometric view of a pendant light structure 100 according to embodiments of the present disclosure. The pendant light structure 100 generally includes a housing structure 102 at least partially surrounding a light source (not shown, for example, a light emitting diode light (LED) source, etc.). The housing structure shown in the example of FIG. 1 has a generally rectangular profile having four side walls 120A, 120B, 120C and 120D and a top portion 104. The four side walls 120A, 120B, 120C and 120D and a top portion 104 may be formed of, for example, clear or semi-transparent materials to allow light to pass through from the light source housed within the housing structure 102. Of course, in other example embodiments, the shape of the pendant light may vary based on aesthetic design choices, desired lighting effects, etc., and may include a variety of profile shapes such as triangular, semi-circular, polygon, etc., and the present disclosure should not be construed as being limited to the rectangular profile shown in FIG. 1.

The housing structure 102 is coupled to a hanging element 114, which can be affixed, for example, to a ceiling or other structure, as described below. The hanging element 114 may include, for example, a stiff member (e.g., decorative conduit member, etc.), or a flexible member (e.g., load-bearing electrical cable, decorative chain, or combinations thereof, etc.). The hanging element 114 is coupled to the top portion 104 of the housing structure 102.

The top portion 104 of the housing structure 102 includes one or more arcuate guide slots 106A and 106B and one or more set screws 108A and 108B disposed within respective arcuate guide slots 106A and 106B. The top portion 104 also includes central hub member 116 generally centered on the top portion 104. The central hub member 116 may include a bore to receive the hanging element 114, and a locking screw 125 to “lock” the central hub member 116 to the hanging element 114. As illustrated, the arcuate guide slots 106A and 106B are generally centered around the central bub member 116. In some embodiments, a length of each of the arcuate guide slots 106A and 106B may be selected to provide approximately 90 degrees of rotation of the housing structure 102.

In operation, and to provide rotation of the housing structure 102 so that at least one of the walls 120A, 120B, 120C and/or 120D is aligned (e.g., facing) to a desired direction, the set screws 106A and 106B may be loosened and the housing structure may be rotated in either direction. Once a desired position is achieved, the set screws 106A and 106B may be tightened to “lock” the housing structure 102 into a desired position. In addition, the central hub member 116 may be locked the hanging element 114, via locking screw 125, which may be particularly useful in embodiments where the hanging element 114 is flexible so that the housing structure 102 remains stationary.

The central hub member 116 may include a base portion 124 coupled to the top portion 104 and may also include a threaded portion 122. The pendant light structure 100 may also include a decorative nut 112 generally dimension to cover the central hub member 116, the arcuate guide slots 106A and 106B and the set screws 108A and 108B. The decorative nut 112 may have a central bore to receive the hanging element 114 therethrough. The decorative nut 112 may include a mating threaded portion (not shown) to mate with the threaded portion 122 of the central hub member 116, so that the decorative nut 112 can be removably affixed to the central hub member 116.

Figure 2:
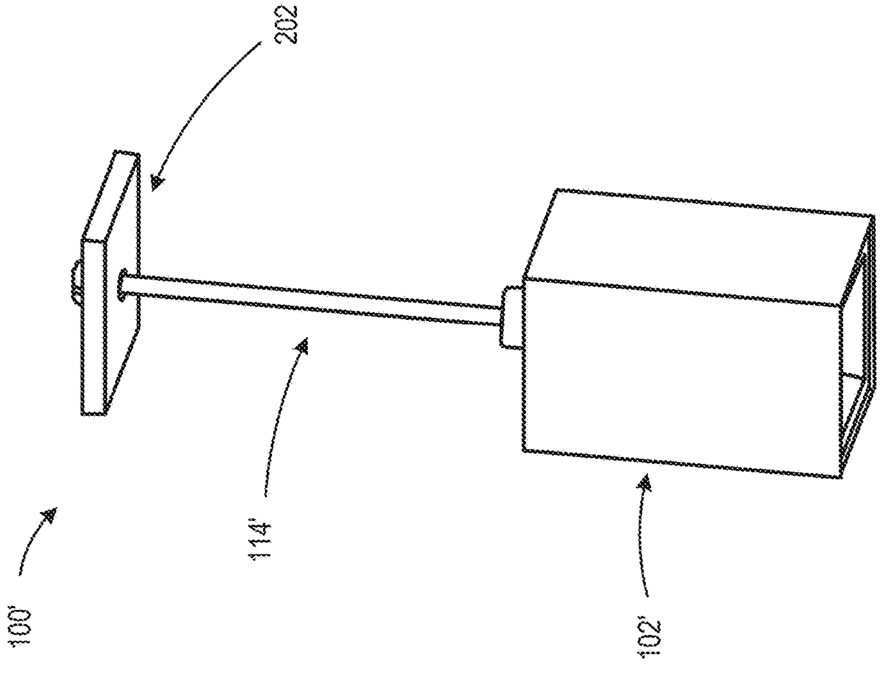
FIG. 2 illustrates an isometric view of a pendant light structure according to one embodiment of the present disclosure.

FIG. 2 illustrates an isometric view of a pendant light structure 100' according to one embodiment of the present disclosure. The pendant light structure 100' of this embodiment includes a housing structure 102' (as described above) and stiff hanging element 114' coupled to a ceiling mount structure 202. The ceiling mount structure 202 may include, for example, a decorative structure dimensioned to “hide” mechanical and electrical coupling of the hanging element 114', for example, coupling within a junction box, etc. The shape and dimensions of the ceiling mount structure 202 may be selected based on, for example, aesthetic elements of the pendant light 100', desired visual effects, etc.

Figure 3A:
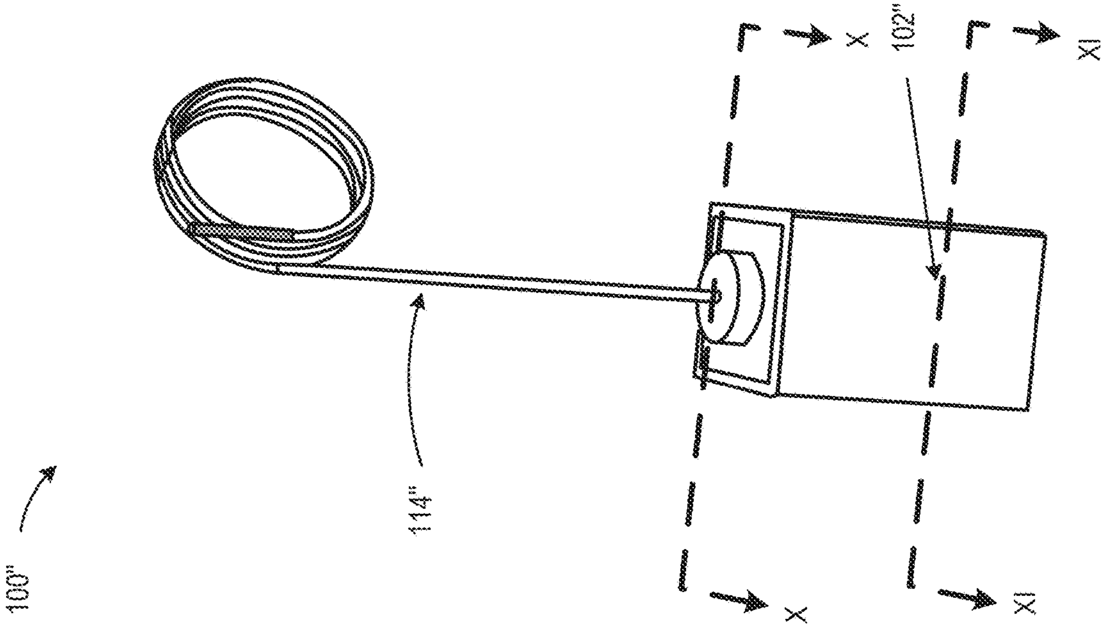
FIG. 3A illustrates an isometric view of a pendant light structure according to another embodiment of the present disclosure.

FIG. 3A illustrates an isometric view of a pendant light structure 100" according to another embodiment of the present disclosure. The pendant light structure 100" of this embodiment includes a housing structure 102" (as described above) and flexible hanging element 114". In this embodiment, the flexible hanging element 114" may be coupled to another fixation structure (not shown, e.g., junction box, bus wire, etc.).

Figure 3B:
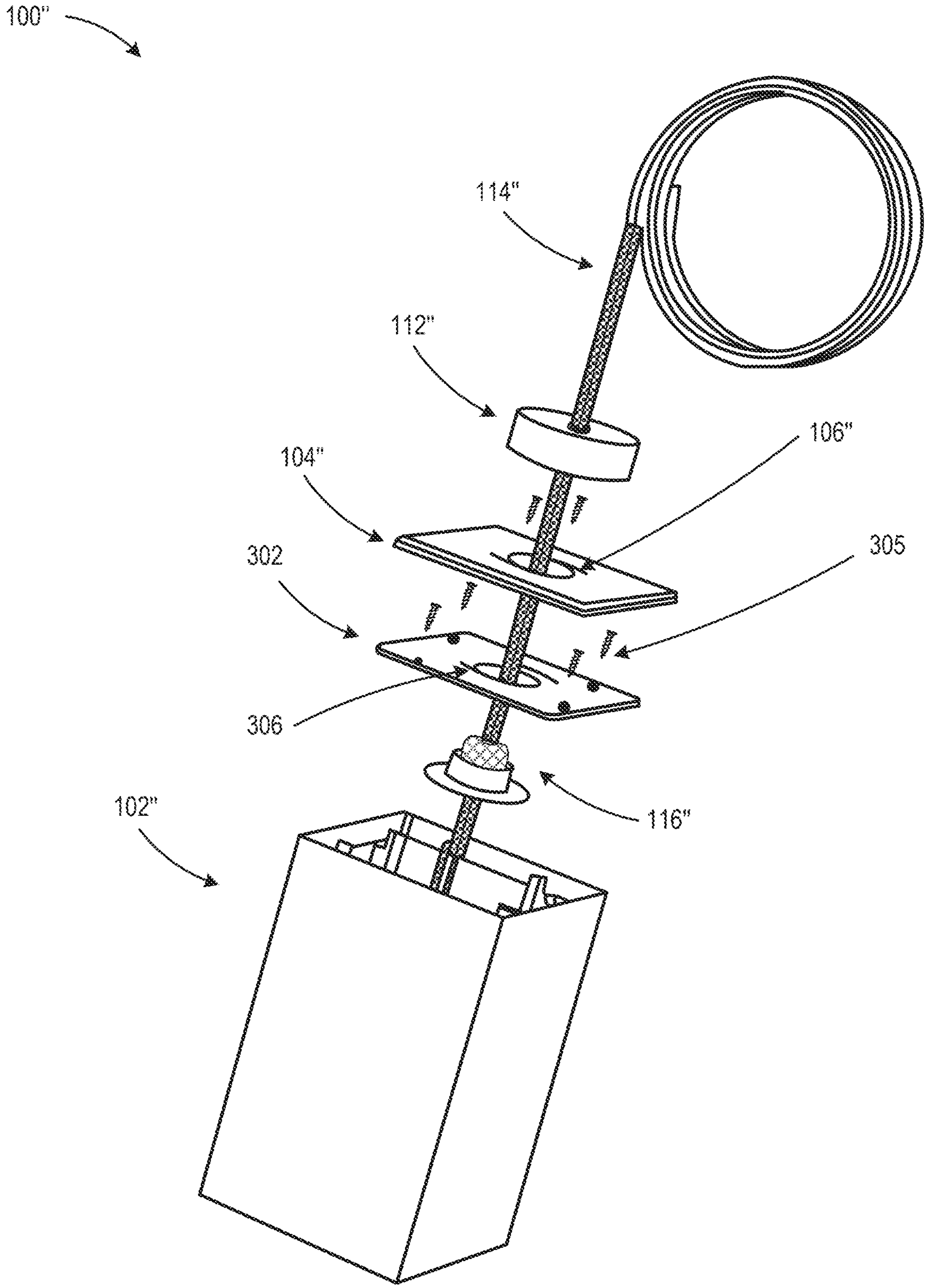
FIG. 3B illustrates an exploded view of the pendant light structure of FIG. 3A.

FIG. 3B illustrates an exploded view of the pendant light structure 100" of FIG. 3A. As illustrated, a locking plate 302 is disposed below the top portion 104". The locking plate 302 is coupled to the housing structure 102" via screws 305. The locking plate 302 includes arcuate guide slots 306, generally aligned with arcuate guide slots 106" of the top portion 104". The central hub 116" is received through the locking plate 302 and top portion 104" and is generally dimensioned to permit rotation of the locking plate 302 and top portion 104" relative to the central hub 116". The flexible hanging element 114" is illustrated as being disposed through the decorative nut 112", top portion 104", locking plate 302, and central hub 116".

Figure 3C:
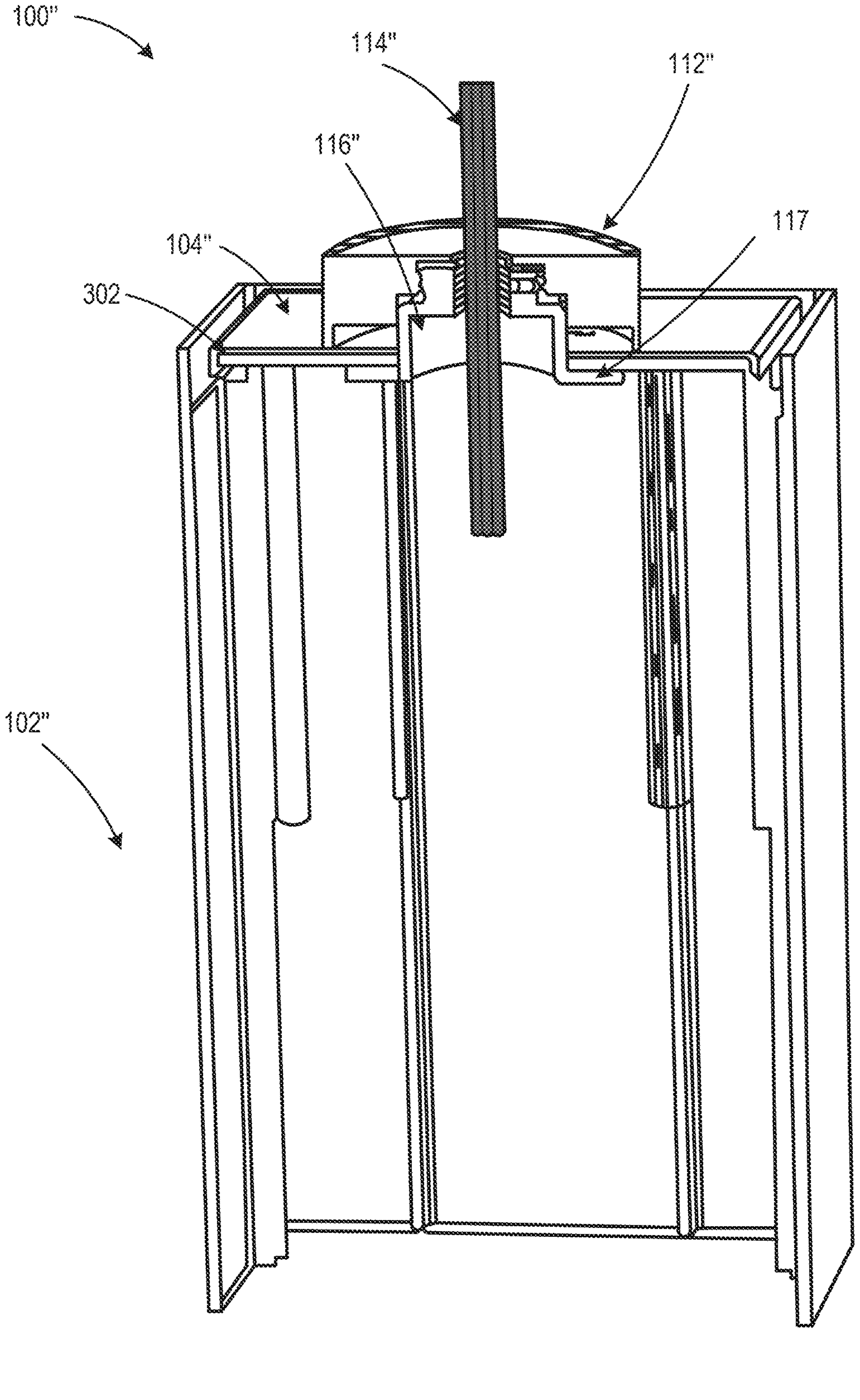
FIG. 3C illustrates an isometric cross-sectional view of the pendant light structure of FIG. 3A, taken along lines X-X.

FIG. 3C illustrates an isometric cross-sectional view of the pendant light structure 100" of FIG. 3A, taken along lines X-X. As illustrated, the central hub 116" includes lower flange portion 117 to "sandwich" the top portion 114" and locking plate 302 to the central hub 116" when the decorative nut 112" is removably coupled to the threads of the central hub 116".

Figure 3D:
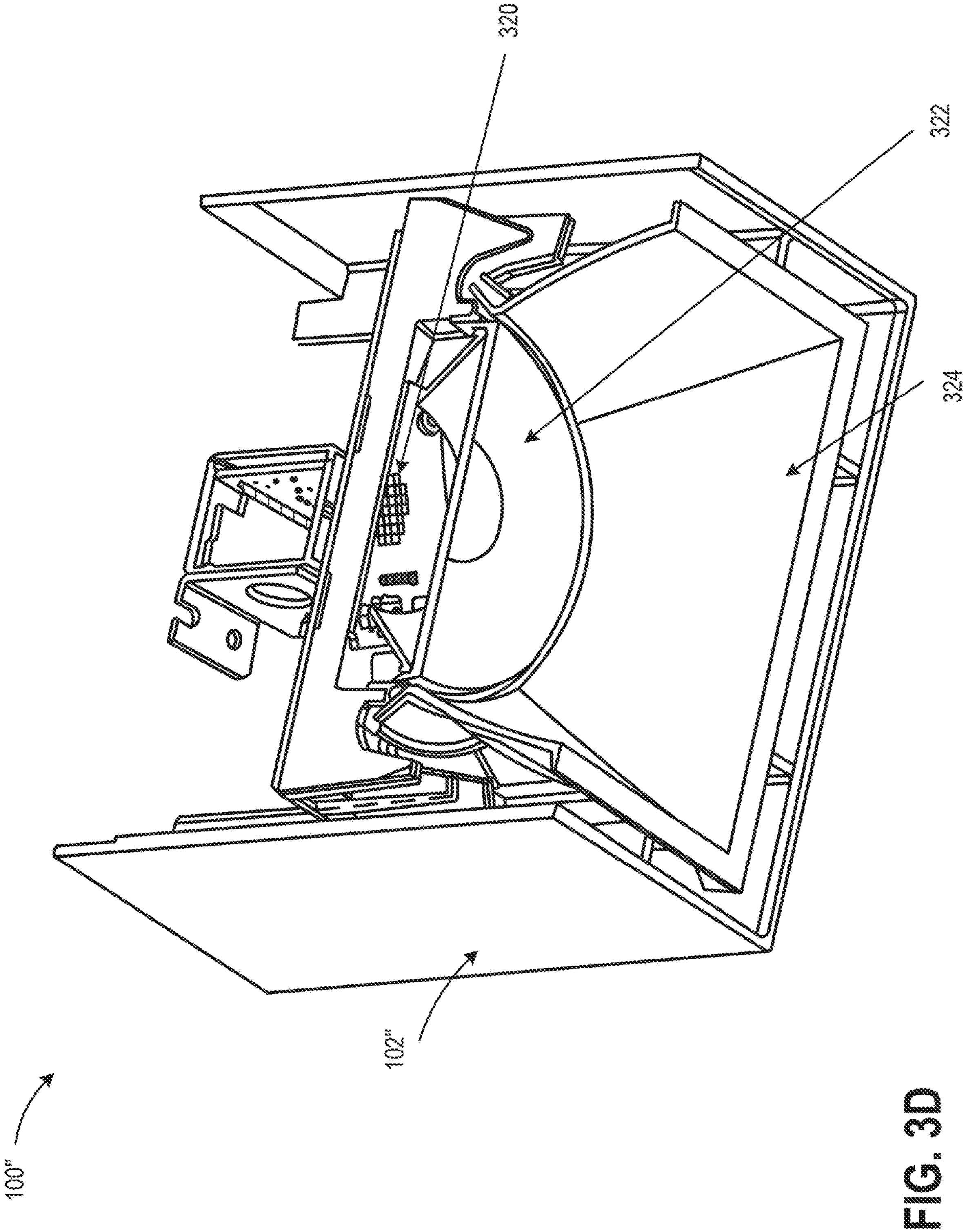
FIG. 3D illustrates another isometric cross-sectional view of the pendant light structure of FIG. 3A, taken along lines XI-XI.
Figure 3E:
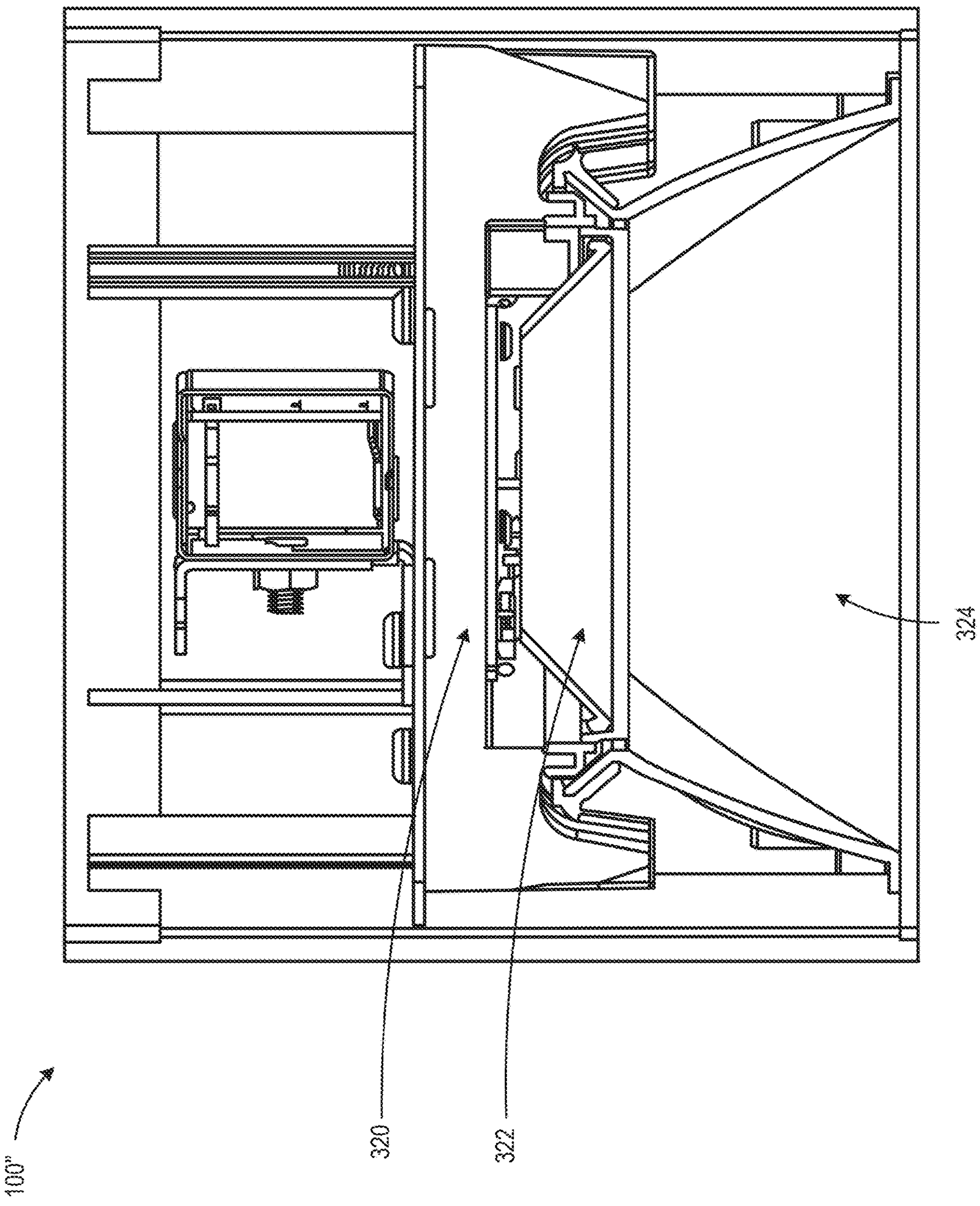
FIG. 3E illustrates another cross-sectional view of the pendant light structure of FIG. 3A, taken along lines XI-XI.

FIG. 3D illustrates another isometric cross-sectional view of the pendant light structure 100" of FIG. 3A, taken along lines XI-XI. FIG. 3D illustrates the lighting portion disposed within a lower portion of the housing 102". The lighting portion generally includes a lighting element 320 (e.g., LED element, etc.), and an optics portion 322 disposed adjacent the lighting element 320 generally configured to provide a desired lighting dispersion pattern. The lighting portion also includes a reflective element 324 at least partially surrounding the optics portion 322, and flared outward toward the opening of the bottom of the housing structure 102". FIG. 3E illustrates another cross-sectional view of the pendant light structure 100" of FIG. 3A, taken along lines XI-XI, and illustrates the lighting element 320, optics portion 322 and reflective element 324.

Accordingly, one embodiment of the present disclosure provides a pendant light. The pendant light includes at least one side wall portion; and a top portion coupled to the at least one side wall portion; the top portion including at least one arcuate slot and at least one set screw engagably disposed within the at least one arcuate slot; wherein the at least one set screw configured to disengage from the at least one arcuate slot to provide rotation of the at least one side wall portion and top portion; and wherein the at least one set screw configured to engage to the at least one arcuate slot to prevent rotation of the at least one side wall portion and top portion.

In another embodiment, present disclosure provides a pendant light that includes at least one side wall portion; a top portion coupled to the at least one side wall portion; the top portion including at least one arcuate slot and at least one set screw engagably disposed within the at least one arcuate slot; wherein the at least one set screw configured to disengage from the at least one arcuate slot to provide rotation of the at least one side wall portion and top portion; and wherein the at least one set screw configured to engage to the at least one arcuate slot to prevent rotation of the at least one side wall portion and top portion; a central hub member centrally disposed on the top portion and centrally disposed relative the at least one arcuate slot; and a hanging element disposed through the central hub member.

In another embodiment, present disclosure provides a pendant light that include a plurality of sidewall portions; and a top portion coupled to the plurality of sidewall portions; the top portion including at least one arcuate slot and at least one set screw engagably disposed within the at least one arcuate slot; wherein the at least one set screw configured to disengage from the at least one arcuate slot to provide rotation of the plurality of sidewall portions and the top portion; and wherein the at least one set screw configured to engage to the at least one arcuate slot to prevent rotation of the plurality of sidewall portions and the top portion.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A pendant light, comprising:
at least one side wall portion; and
a top portion coupled to the at least one side wall portion; the top portion including at least one arcuate slot and at least one set screw engagably disposed within the at least one arcuate slot; wherein the at least one set screw configured to disengage from the at least one arcuate slot to provide rotation of the at least one side wall portion and top portion; and wherein the at least one set screw configured to engage to the at least one arcuate slot to prevent rotation of the at least one side wall portion and top portion.

2. The pendant light of claim 1, further comprising a central hub member centrally disposed on the top portion and centrally disposed relative the at least one arcuate slot.

3. The pendant light of claim 2, further comprising a hanging element disposed through the central hub member.

4. The pendant light of claim 3, wherein the hanging element is a stiff member.

5. The pendant light of claim 3, wherein the hanging element is a flexible member.

6. The pendant light of claim 3, further comprising a finish nut movably disposed about the hanging element; and wherein the central hub member further comprising a threaded portion and the finish nut further comprising a mated threaded portion to mate with the threated portion of the central hub member.

7. A pendant light, comprising:

at least one side wall portion;

a top portion coupled to the at least one side wall portion; the top portion including a first arcuate slot and a second arcuate slot and a first set screw engagably disposed within the first arcuate slot and a second set screw engagably disposed within the second arcuate slot; wherein the first and second set screw configured to disengage from the first and second arcuate slots, respectively, to provide rotation of the at least one side wall portion and top portion; and wherein the first and second set screw configured to engage to the first and second arcuate slot, respectively, to prevent rotation of the at least one side wall portion and top portion;

a central hub member centrally disposed on the top portion and centrally disposed relative the at least one arcuate slot; and a hanging element disposed through the central hub member.

8. The pendant light of claim 7, wherein the hanging element is a stiff member.

9. The pendant light of claim 7, wherein the hanging element is a flexible member.

10. The pendant light of claim 7, further comprising a finish nut movably disposed about the hanging element; and wherein the central hub member further comprising a threaded portion and the finish nut further comprising a mated threaded portion to mate with the threated portion of the central hub member.

11. A pendant light, comprising:

a plurality of sidewall portions; and a top portion coupled to the plurality of sidewall portions; the top portion including at least one arcuate slot and at least one set screw engagably disposed within the at least one arcuate slot; wherein the at least one set screw configured to disengage from the at least one arcuate slot to provide rotation of the plurality of sidewall portions and the top portion; and wherein the at least one set screw configured to engage to the at least one arcuate slot to prevent rotation of the plurality of sidewall portions and the top portion.

12. The pendant light of claim 11, further comprising a central hub member centrally disposed on the top portion and centrally disposed relative the at least one arcuate slot.

13. The pendant light of claim 12, further comprising a hanging element disposed through the central hub member.

14. The pendant light of claim 13, wherein the hanging element is a stiff member.

15. The pendant light of claim 13, wherein the hanging element is a flexible member.

16. The pendant light of claim 13, further comprising a finish nut movably disposed about the hanging element; and wherein the central hub member further comprising a threaded portion and the finish nut further comprising a mated threaded portion to mate with the threated portion of the central hub member.

17. The pendant light of claim 11, wherein the plurality of sidewall portions form a rectangular structure.

18. The pendant light of claim 11, wherein the plurality of sidewall portions to house a lighting element.

19. The pendant of claim 11, wherein at least one of the plurality of sidewall portions is formed of a transparent or semi-transparent material.

* * * * *